United States Patent
Zhang et al.

(10) Patent No.: US 12,448,422 B2
(45) Date of Patent: Oct. 21, 2025

(54) TRANSCRIPTION FACTOR NCGL0581 MUTANT AND USE THEREOF IN L-SERINE DETECTION

(71) Applicants: JITRI FUTURE FOOD TECHNOLOGY INSTITUTE CO., LTD., Jiangsu (CN); JIANGNAN UNIVERSITY, Jiangsu (CN)

(72) Inventors: Xiaomei Zhang, Wuxi (CN); Yamin Huang, Wuxi (CN); Yujie Gao, Wuxi (CN); Guoqiang Xu, Wuxi (CN); Hui Li, Wuxi (CN); Jinsong Shi, Wuxi (CN); Zhenghong Xu, Wuxi (CN)

(73) Assignees: Jitri Future Food Technology Institute Co., Ltd., Wuxi (CN); Jiangnan University, Wuxi (CN)

( * ) Notice: Subject to any disclaimer, the term of this patent is extended or adjusted under 35 U.S.C. 154(b) by 0 days.

(21) Appl. No.: 18/957,819

(22) Filed: Nov. 24, 2024

(65) Prior Publication Data
US 2025/0092102 A1 Mar. 20, 2025

Related U.S. Application Data

(63) Continuation of application No. PCT/CN2024/088181, filed on Apr. 17, 2024.

(30) Foreign Application Priority Data

Sep. 6, 2023 (CN) .......................... 202311145074.X

(51) Int. Cl.
*G01N 33/68* (2006.01)
*C07K 14/47* (2006.01)
*C12Q 1/6897* (2018.01)

(52) U.S. Cl.
CPC ........ *C07K 14/4705* (2013.01); *C12Q 1/6897* (2013.01); *G01N 33/68* (2013.01)

(58) Field of Classification Search
None
See application file for complete search history.

(56) References Cited

U.S. PATENT DOCUMENTS

2005/0014234 A1 1/2005 Zelder et al.
2020/0239897 A1 7/2020 Serber et al.

FOREIGN PATENT DOCUMENTS

CN 112375771 A 2/2021
CN 117209573 A 12/2023

OTHER PUBLICATIONS

Payankaulam S et al. Curr Biol. Sep. 14, 2010;20(17):R764-71 (Year: 2010).*
Xin Zhang et al., "Integration of ARTP mutagenesis with biosensor-mediated high-throughput screening to improve L-serine yield in Corynebacterium glutamicum" Applied Microbiology and Biotechnology, pp. 1-13 (May 3, 2018).
Xiaomei Zhang et al., "High-yield production of L-serine through a novel identified exporter combined with synthetic pathway in Corynebacterium glutamicum" Microb Cell Fact (2020) 19:115, pp. 1-14 (May 29, 2020).

* cited by examiner

*Primary Examiner* — Kimberly Chong
*Assistant Examiner* — Douglas Charles Ryan
(74) *Attorney, Agent, or Firm* — SZDC Law PC

(57) ABSTRACT

The present invention provides a transcription factor NCgl0581 mutant and use thereof in L-serine detection, belonging to the technical field of biological detection. According to the present invention, key binding sites of the transcription factor NCgl0581 with L-serine are obtained through molecular docking, and further model analysis and virtual screening are carried out to obtain an L-serine biosensor mutant NCgl0581$^{E136P}$. Experiments show that the biosensor constructed based on the mutant NCgl0581$^{E136P}$ can respond to 25 mM serine, which is half of the response concentration before the mutation. The present invention reduces the detection limit of the biosensor through mutation, lays a foundation for the detection of low-concentration L-serine, and has good application value and prospect.

7 Claims, 2 Drawing Sheets
Specification includes a Sequence Listing.

SEQUENCE LISTING

```
Sequence total quantity: 8
SEQ ID NO: 1                moltype = AA    length = 303
FEATURE                     Location/Qualifiers
source                      1..303
                            mol_type = protein
                            organism = synthetic construct
SEQUENCE: 1
VLNLNRLHIL QEFHRLGTIT AVAESMNYSR SAISQQMALL EKEIGVKLFE KSGRNLYFTE   60
QGEVLASETH AIMAAVDHAR AAVLDSLSEV SGTLKVTSFQ SLLFTLAPKA IARLTEKYPH  120
LQVEISQLEV TAALEELRAR RVDVALGEEY PVEVPLVEAS IHREVLFEDP MLLVTPASGP  180
YSGLTLPELR DIPIAIDPPD LPAGEWVHRL CRRAGFEPRV TFETSDPMLQ AHLVRSGLAV  240
TFSPTLLTPM LESVHIQPLP GNPTRTLYTA VREGRQHPA IKAFRRALAH VAKESYLEAR  300
LVE                                                                303

SEQ ID NO: 2                moltype = DNA    length = 909
FEATURE                     Location/Qualifiers
source                      1..909
                            mol_type = other DNA
                            organism = synthetic construct
SEQUENCE: 2
gtgctcaatc tcaaccgctt acacatcctg caggaattcc accgcctggg aacgattaca   60
gcagtggcgg aatccatgaa ctacagccgc tctgccatct cccaacaaat ggcgctgctg  120
gaaaagaaa ttggtgtgaa actctttgaa aaaagcggcc gaaacctcta cttcacagaa  180
caaggcgaag tgttggcctc agaaacacat gcgatcatgg cagcagtcga ccatgcccgc  240
gcagccgttc tagattcgct gtctgaagtg tccggaacgc tgaaagtcac ctccttccaa  300
tccctgctgt tcacccttgc cccgaaagcc atcgcgcgcc tgaccgagaa atacccacac  360
ctgcaagtag aaatctccca actagaagtc accgcagcgc tcgaagaact ccgcgcccgc  420
cgcgtcgacg tcgcactcgg cgaggaatac cccgtggaag tccccttgt tgaggccagc  480
attcaccgcg aagtcctctt cgaagacccc atgctgctcg tcacccagc aagcggccca  540
tactctggcc tcaccctgcc agaactccgc gacatcccca tcgccatcga tccacccgac  600
cttcccgcgg gcgaatgggt ccataggctc tgccggcgcg ccgggtttga gccccgcgtg  660
acctttgaaa ccagcgatcc catgctccaa gcacacctcg tcgtagcgg cttggccgtg  720
acattttccc ccacactgct caccccgatg ctggaaagcg tgcacatcca gccgctgccc  780
ggcaacccca cgcgcacgct ctacaccgcg gtcaggaagg ggcgcagggg catccagcc  840
attaaagctt ttcgacgagc cctcgcccat gtggccaaag aatcttattt ggaggctcgt  900
ctagtagag                                                         909

SEQ ID NO: 3                moltype = AA    length = 303
FEATURE                     Location/Qualifiers
source                      1..303
                            mol_type = protein
                            organism = synthetic construct
SEQUENCE: 3
VLNLNRLHIL QEFHRLGTIT AVAESMNYSR SAISQQMALL EKEIGVKLFE KSGRNLYFTE   60
QGEVLASETH AIMAAVDHAR AAVLDSLSEV SGTLKVTSFQ SLLFTLAPKA IARLTEKYPH  120
LQVEISQLEV TAALEPLRAR RVDVALGEEY PVEVPLVEAS IHREVLFEDP MLLVTPASGP  180
YSGLTLPELR DIPIAIDPPD LPAGEWVHRL CRRAGFEPRV TFETSDPMLQ AHLVRSGLAV  240
TFSPTLLTPM LESVHIQPLP GNPTRTLYTA VREGRQHPA IKAFRRALAH VAKESYLEAR  300
LVE                                                                303

SEQ ID NO: 4                moltype = DNA    length = 909
FEATURE                     Location/Qualifiers
source                      1..909
                            mol_type = other DNA
                            organism = synthetic construct
SEQUENCE: 4
gtgctcaatc tcaaccgctt acacatcctg caggaattcc accgcctggg aacgattaca   60
gcagtggcgg aatccatgaa ctacagccgc tctgccatct cccaacaaat ggcgctgctg  120
gaaaagaaa ttggtgtgaa actctttgaa aaaagcggcc gaaacctcta cttcacagaa  180
caaggcgaag tgttggcctc agaaacacat gcgatcatgg cagcagtcga ccatgcccgc  240
gcagccgttc tagattcgct gtctgaagtg tccggaacgc tgaaagtcac ctccttccaa  300
tccctgctgt tcacccttgc cccgaaagcc atcgcgcgcc tgaccgagaa atacccacac  360
ctgcaagtag aaatctccca actagaagtc accgcagcgc tcgaaccgct ccgcgcccgc  420
cgcgtcgacg tcgcactcgg cgaggaatac cccgtggaag tccccttgt tgaggccagc  480
attcaccgcg aagtcctctt cgaagacccc atgctgctcg tcacccagc aagcggccca  540
tactctggcc tcaccctgcc agaactccgc gacatcccca tcgccatcga tccacccgac  600
cttcccgcgg gcgaatgggt ccataggctc tgccggcgcg ccgggtttga gccccgcgtg  660
acctttgaaa ccagcgatcc catgctccaa gcacacctcg tcgtagcgg cttggccgtg  720
acattttccc ccacactgct caccccgatg ctggaaagcg tgcacatcca gccgctgccc  780
ggcaacccca cgcgcacgct ctacaccgcg gtcaggaagg ggcgcagggg catccagcc  840
attaaagctt ttcgacgagc cctcgcccat gtggccaaag aatcttattt ggaggctcgt  900
ctagtagag                                                         909

SEQ ID NO: 5                moltype = DNA    length = 90
FEATURE                     Location/Qualifiers
source                      1..90
                            mol_type = other DNA
                            organism = synthetic construct
```

```
SEQUENCE: 5
gacacctcca aaattgttca gtattactta actatagttg gctgttttc gatctagtcc    60
ttaaaggttt ctttggcaat aatcaagggc                                    90

SEQ ID NO: 6            moltype = DNA   length = 720
FEATURE                 Location/Qualifiers
source                  1..720
                        mol_type = other DNA
                        organism = synthetic construct
SEQUENCE: 6
atggtgagca agggcgagga gctgttcacc ggggtggtgc ccatcctggt cgagctggac    60
ggcgacgtaa acggccacaa gttcagcgtg tccggcgagg gcgagggcga tgccacctac   120
ggcaagctga cactgaagtt catctgcacc accggcaagc tgcccgtgcc ctggcccacc   180
ctcgtgacca ccttcggcta cggcctgcag tgcttcgccc gctaccccga ccacatgaag   240
cagcacgact tcttcaagtc cgccatgccc gaaggctacg tccaggagcg caccatcttc   300
ttcaaggacg acggcaacta caagacccgc gccgaggtga agttcgaggg cgacaccctg   360
gtgaaccgca tcgagctgaa gggcatcaac ttcaaggagg acggcaacat cctggggcac   420
aagctggagt acaactacaa cagccacaac gtctatatca tggccgacaa gcagaagaac   480
ggcatcaagg tgaacttcaa gatccgccac aacatcgagg gcggcagcgt gcagctcgcc   540
gaccactacc agcagaacac ccccatcggc gacggcccg tgctgctgcc cgacaaccac   600
tacctgagct accagtccgc cctgagcaaa gaccccaacg agaagcgcga tcacatggtc   660
ctgctggagt tcgtgaccgc cgccgggatc actctcggca tggacgagct gtacaagtaa   720

SEQ ID NO: 7            moltype = DNA   length = 38
FEATURE                 Location/Qualifiers
source                  1..38
                        mol_type = other DNA
                        organism = synthetic construct
SEQUENCE: 7
aagtcaccgc agcgctcgaa ccgctccgcg cccgccgc                            38

SEQ ID NO: 8            moltype = DNA   length = 38
FEATURE                 Location/Qualifiers
source                  1..38
                        mol_type = other DNA
                        organism = synthetic construct
SEQUENCE: 8
tcgacgcggc gggcgcggag ttcggcgagc gctgcggt                            38
```

TRANSCRIPTION FACTOR NCGL0581 MUTANT AND USE THEREOF IN L-SERINE DETECTION

This application is a Continuation application of PCT/CN2024/088181, filed on Apr. 17, 2024, which claims priority to Chinese Patent Application No. CN 202311145074.X, filed on Sep. 6, 2023, which is incorporated by reference for all purposes as if fully set forth herein.

A Sequence Listing XML file named "10015_0164.xml" created on Nov. 24, 2024, and having a size of 11,248 bytes, is filed concurrently with the specification. The sequence listing contained in the XML file is part of the specification and is herein incorporated by reference in its entirety.

FIELD OF THE INVENTION

The present invention relates to a transcription factor NCgl0581 mutant and use thereof in L-serine detection, belonging to the technical field of biological detection.

DESCRIPTION OF THE RELATED ART

L-serine is involved in many important intracellular activities and has broad application prospects in many fields such as medicine, food and cosmetics. Recent studies have shown that L-serine can stimulate the proliferation of many types of cells, and its anabolic pathway is closely related to the generation and proliferation of tumor cells, so it is very likely to become an important tumor marker and it is very important to explore an efficient and convenient detection method for L-serine. Biosensors can achieve the specific response of target compounds, so they have been widely used to detect the concentration of metabolites. However, the L-serine biosensor constructed based on the wild-type transcription factor NCgl0581 has problems such as a higher detection limit, so it is difficult to be applied to the analysis and detection of low-concentration L-serine.

A biosensor is mainly composed of two important elements: a bio-sensitive membrane and a transducer. When an analyte enters the bio-sensitive membrane through certain permeation or flow, etc., it will be specifically bound to the bio-sensitive membrane through molecular recognition, and the generated physical, chemical or biological signals can be converted into light signals, electricity signals or the like through the transducer, so as to analyze and detect the analyte. Biosensors mainly include FRET sensors, ribose switch sensors and transcription factor (TF) sensors. In recent years, biosensors have been widely used in the optimization of a biosynthesis pathway and real-time monitoring of metabolites, and have great potential in the construction and screening of high-yield strains and high-efficiency enzymes.

Among them, the biosensor based on transcription factors is the most widely used. When a target metabolite reaches a certain concentration, the transcription factor achieves the response property by changing the conformation of its own protein and converts the concentration signal of the target metabolite into such as fluorescence signals for output. NCgl0581 is an endogenous transcription regulator in *Corynebacterium glutamicum*, belonging to the LysR transcription family regulator. NCgl0581 has a signal molecule of L-serine, and is used to regulate the promoter $P_{SerE}$. Biosensors based on the transcription factor NCgl0581 can be used to detect the concentration of L-serine and screen L-serine-producing strains, etc. However, wild-type L-serine biosensors have a higher detection limit, so it is difficult to be applied to the analysis and detection of low-concentration L-serine. Generally, the performance of a biosensor can be improved by traditional strategies such as adjusting the strength of a promoter, and RBS. However, traditional static improvement methods have problems such as less data and poor generality. By combining computer-aided design and using rational design methods such as a mathematical model, the performance of a biosensor can be predictably improved to achieve intelligent regulation. Therefore, the present invention has been proposed.

SUMMARY OF THE INVENTION

In order to solve the above problems, in the present invention, the L-serine biosensor, wild-type transcription factor NCgl0581, is taken as the research object, its key binding site with the signal molecule L-serine is obtained through molecular docking, and further model analysis and virtual screening are carried out to obtain an L-serine biosensor mutant NCgl0581$^{E136P}$, which reduces the detection limit of the biosensor, increases the sensitivity and lays a foundation for the detection of low-concentration L-serine.

The first object of the present invention is to provide a transcription factor NCgl0581 mutant, which mutant is obtained by mutating the 136th glutamic acid of an amino acid sequence as shown in SEQ ID NO.1 into proline (NCgl0581$^{E136P}$)

The second object of the present invention is to provide a nucleic acid molecule encoding the transcription factor NCgl0581 mutant above.

Preferably, the nucleotide sequence of the nucleic acid molecule is as shown in SEQ ID NO.4.

The third object of the present invention is to provide an expression vector carrying the nucleic acid molecule above.

The fourth object of the present invention is to provide a host cell expressing the transcription factor NCgl0581 mutant above.

Preferably, the host cell is a bacterium, a fungus, a plant cell or an animal cell.

The fifth object of the present invention is to provide use of the above transcription factor NCgl0581 mutant, nucleic acid molecule, expression vector or host cell in preparation of an L-serine detection product.

The sixth object of the present invention is to provide an L-serine detection product, which detection product contains the above transcription factor NCgl0581 mutant, nucleic acid molecule, expression vector or host cell.

Preferably, the detection product is a biosensor, which includes a coding gene of the transcription factor NCgl0581 mutant, a promoter for initiating expression of the coding gene of the transcription factor NCgl0581 mutant, a promoter $P_{SerE}$ and a reporter gene whose expression is initiated by the promoter $P_{SerE}$, wherein the promoter $P_{SerE}$ is located at the downstream of the coding gene of the transcription factor NCgl0581 mutant.

For example, taking L-serine as the detection target, the detection principle of the biosensor constructed in the present invention is as follows: the promoter activates the expression of the NCgl0581 gene, and the NCgl0581 protein binds to L-serine to change its protein conformation, and then the downstream promoter $P_{SerE}$ is further initiated, so that the reporter gene is expressed, signals such as fluorescence signals are output, and the quantitative detection of L-serine molecules is achieved according to the intensity of fluorescence signals. Of course, the biosensor constructed in the present invention can respond to 25 mM L-serine, laying a foundation for the detection of low-concentration L-serine samples, which is the advantage of the present invention.

Preferably, the promoter that can initiate the expression of the coding gene of the transcription factor NCgl0581 mutant can be an inducible promoter or a constitutive promoter, including but not limited to $P_{NCgl0581}$, $P_{B6}$, $P_e$, $P_{a16}$, etc.

Preferably, the reporter gene can be any recognizable signal, such as a fluorescent gene, a resistance gene, etc.

Preferably, the elements above are located on the same plasmid vector, and introduced into host cells to detect the target. The vector used in one example of the present invention is pDXW-11.

The seventh object of the present invention is to provide a method for detecting L-serine, including the following steps:

qualitative detection: incubating a sample to be tested with host cells containing the biosensor above, detecting a reporter gene signal after the incubation is completed, and determining whether the sample to be tested contains the target according to the presence or absence of the signal;

quantitative detection:

S1, incubating samples containing the target with different concentrations with host cells containing the biosensor above, and detecting signal intensity of a reporter gene after the incubation is completed;

S2, establishing a relationship curve between signals of the reporter gene and concentrations of the target; and S3, repeating the step S1 using the actual sample to be tested, and substituting the result into the relationship curve in S2 to calculate the content of the target.

The present invention has the following beneficial effects:

In the present invention, an NCgl0581$^{E136P}$ mutant is obtained by docking the transcription factor NCgl0581 with L-serine and mutating the obtained binding key site, and a biosensor is constructed based on the E136P mutant of the transcription factor NCgl0581, which comprises a coding gene of the E136P mutant and a promoter $P_{NCgl0581}$ thereof, a promoter $P_{SerE}$ and a reporter gene. Among them, the transcription factor NCgl0581 can be induced by L-serine, and can bind to L-serine through changing its own structure, and then initiates the downstream promoter $P_{SerE}$, thus expressing the reporter gene. The response concentration of the NCgl0581 mutant to L-serine was verified by transforming the biosensor into *E. coli*, and then adding L-serine with different concentration gradients. It is found that the detection limit of the biosensor constructed based on the NCgl0581$^{E136P}$ mutant is reduced by half, with the response concentration to L-serine as low as 25 mM, which indicates the superiority of the mutant NCgl0581$^{E136P}$ in the detection of low-concentration L-serine and lays a foundation for the analysis and detection of low-concentration L-serine.

DETAILED DESCRIPTION OF THE PREFERRED EMBODIMENTS

Figure 1:
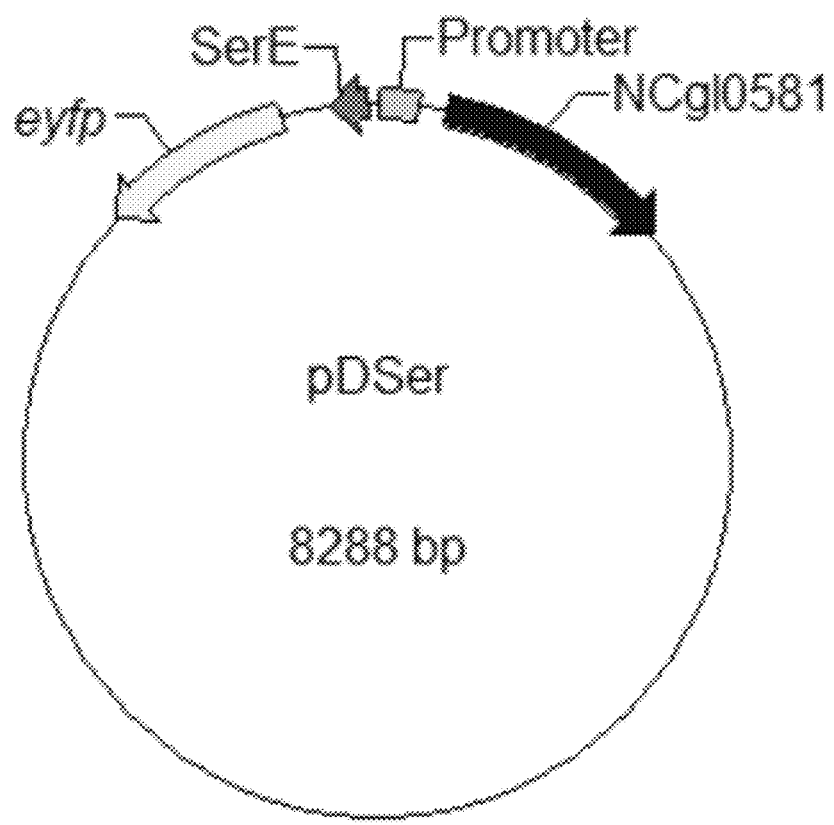
FIG. 1 is a schematic diagram of the construction of a biosensor of the present invention.

The present invention will be further described with the accompanying drawings and specific examples, so that those skilled in the art can better understand and implement the present invention, but the examples given are not taken as limitations of the present invention.

The technical solutions involved in the present invention is as follows:

The difficulty in how to change the detection range of L-serine by mutation technology lies in the selection of mutation sites. In the present invention, the binding affinity of L-serine and the NCgl0581 tetramer was determined by construction of three-dimensional structures of the wild-type transcription regulatory factor NCgl0581 protein and L-serine, and using the MOE-Dock software to simulate molecular docking, and key binding sites were determined according to the change of the binding affinity, then virtual mutation was carried out to determine mutation sites and directions, and mutants such as E136P were designed according to the simulation calculation results, then the dose response curve of the biosensor was obtained by the experiment of exogenous addition of L-serine with a concentration gradient, and finally the change of the detection limit of the mutant biosensor was verified.

The medium, various determination methods and the like involved in the following examples were referred to as follows:

LB medium (g/L): peptone 10; yeast extract 5; NaCl 10 (solid medium, agar powder 20); sterilization conditions: 121° C., 20 min.

Determination of fluorescence intensity and biomass of bacteria: *E. coli* in the medium was centrifuged at 4° C. and 4000 g for 5 min to collect the bacteria, washed with a precooled PBS buffer for 2-3 times, resuspended and diluted in a PBS buffer (OD$_{600}$=0.2-0.8). 200 μL of the diluted bacterial liquid was pipetted and added into a 96-well plate, and the fluorescence intensity and bacterial concentration were determined with a multifunctional microplate reader. During the determination of the fluorescence intensity, the parameters of the microplate reader were set to a yellow fluorescent protein excitation wavelength of 488 nm and an emission wavelength of 590/9 nm; and during the determination of the bacteria concentration, the parameters of the microplate reader were set to λ=600.

Transformation method of *E. coli*: Taking the mutant E136P as an example, competent *E. coli* cells were thawed on ice, and 100 pg-10 ng of the plasmid containing the mutant E136P was mixed well with the competent cells on an ultra-clean workbench, and placed on ice for 30 min. After heat shock in water bath at 42° C. for 2 min, the mixture was placed on ice for 2 min, and the bacterial liquid was added to 900 μL of a fresh LB liquid medium, and cultured at 37° C. and 220 rpm for 1 h. The bacteria were collected by centrifugation, resuspended, and coated on a solid LB plate containing Kan, and inverted in an incubator at 37° C. for overnight culture.

Example 1: Model Analysis and Virtual Screening

The homology modeling of the wild-type transcription regulator NCgl0581 protein was carried out by the MOE molecular simulation software. According to the GB/VI scoring function, the intermediate model with the best score was selected as the final model, and the model was described and analyzed by PyMOL and the save v6.0 software. Then the downloaded two-dimensional structure of L-serine was converted into three-dimensional structure by minimizing energy in MOE.

The constructed NCgl0581 tetramer model and the substrate L-serine was molecular docked by MOE-Dock. The optimal conformation was screened by considering interactions between the protein and L-serine, binding sites and docking scores comprehensively, and the binding pattern was analyzed by PyMOL.

The change in affinity of NCgl0581 to L-serine was determined by residue scanning under the LowMode module, and the conformation space of the mutant was determined. The conformation of the mutant that met the energy criterion was output, so as to construct a virtual mutant library by simulating mutation according to the change in binding affinity, and design a E136P mutant according to the mutation site and mutation direction guided by the simulation calculation results.

Example 2: Point Mutation of Transcription Factor NCgl0581$^{E136P}$

Site-directed mutation was carried out by PCR, i.e., the E136 site of the transcription factor NCgl0581 (see SEQ ID NO.1 for the amino acid sequence and SEQ ID NO.2 for the nucleotide sequence) was site-directed mutated, so that glutamic acid at site 136 was mutated into proline. Using the genome of a strain as the template, 500 bp before and 500 bp after the point mutation was selected as the amplification targets, the homologous arm gene fragment containing the point mutation was amplified by the primers ncgl0581-F and ncgl0581-R. The fragment was connected with the plasmid pK18mobsacB double digested by EcoR I and Xba I to construct a reverse mutant plasmid, which was transformed into the competent cells of E. coli, cultured overnight at 37° C., and the colonies of the transformants grown were subjected to PCR, and sent to Shanghai Sangon Biotech Co., Ltd. for sequencing; and the strain with correct result was successfully mutated. The amino acid sequence of the E136P mutant is shown in SEQ ID NO.3, and the nucleotide sequence is shown in SEQ ID No.4.

Among them, the primers used for E136P mutation are shown in Table 1.

TABLE 1

Site-directed mutation primers

| Mutation primers of transcription regulator NCgl0581 protein E136P | |
|---|---|
| ncgl0581-F | AAGTCACCGCAGCGCTCGAACCGCTCCGCGCCCGC CGC (SEQ ID NO. 7) |
| ncgl0581-R | TCGACGCGGCGGGCGCGGAGTTCGGCGAGCGCTGC GGT (SEQ ID NO. 8) |

Example 3: Verification of the Detection Range of the L-Serine Biosensor Mutant Construction of L-serine biosensor: The schematic diagram is shown in FIG. 1. One part of the biosensor was used for the expression of the transcription regulator NCgl0581, and the other part was connected with the promoter $P_{SerE}$ regulated by NCgl0581, and then connected with eyfp, which was used to characterize the binding of the biosensor to L-serine so as to regulate the transcription level of eyfp. The nucleotide sequence of the promoter $P_{SerE}$ is shown in SEQ ID NO.5, and the nucleotide sequence of the reporter gene eyfp is shown in SEQ ID No.6.

The detection limit of the L-serine biosensor (pDSer) based on NCgl0581 was 50 mM. When the concentration of L-serine was lower than 50 mM, the fluorescence value remained substantially unchanged, and could not respond to lower concentration of L-serine. The response concentration of the mutant biosensor based on NCgl0581$^{E136P}$ to L-serine was reduced to 25 mM by the exogenous addition experiment as follows.

On the basis of site-directed mutation, E. coli JM109 single colonies containing wild-type NCgl0581 and mutant E136P were selected and inoculated into a 10 mL LB (100 μg/mL Kan) liquid medium, and cultured overnight at 37° C. and 220 rpm. A 950 μL of fresh LB medium was added to each well in a sterilized 24-well plate, and then L-serine with different concentrations was added, with the final concentration controlled to be 0, 25, 50, 75 or 100 mM respectively. Finally, 50 μL of the overnight culture bacteria liquid was added to each well, and the well plate was cultured in a shaker for 2 h at 37° C. and 220 rpm.

E. coli JM109 in the medium was centrifuged for 5 min to collect the bacteria, washed with a PBS buffer for 2-3 times, resuspended and diluted in a PBS buffer (OD$_{600}$=0.2-0.8). 200 μL of the diluted bacterial liquid was pipetted and added into a 96-well plate, and the bacterial concentration OD$_{600}$ and fluorescence intensity were determined with a multifunctional microplate reader, with the calculated fluorescence intensity/OD$_{600}$ as the fluorescence intensity value per unit of bacterial cell.

Example 4: Analysis of the Influence of Mutation on the Detection Range of L-Serine Biosensor With the fluorescence intensity/OD$_{600}$ as the ordinate and the L-serine concentration as the abscissa, the dose response curve of the biosensor to L-serine was drawn by OriginPro 8.5. When the dose response curve showed an obvious upward trend, the corresponding L-serine concentration was defined as the detection limit of the biosensor. According to the response curve, the detection range of wild-type NCgl0581 and mutant E136P could be obtained respectively.

Figure 2:
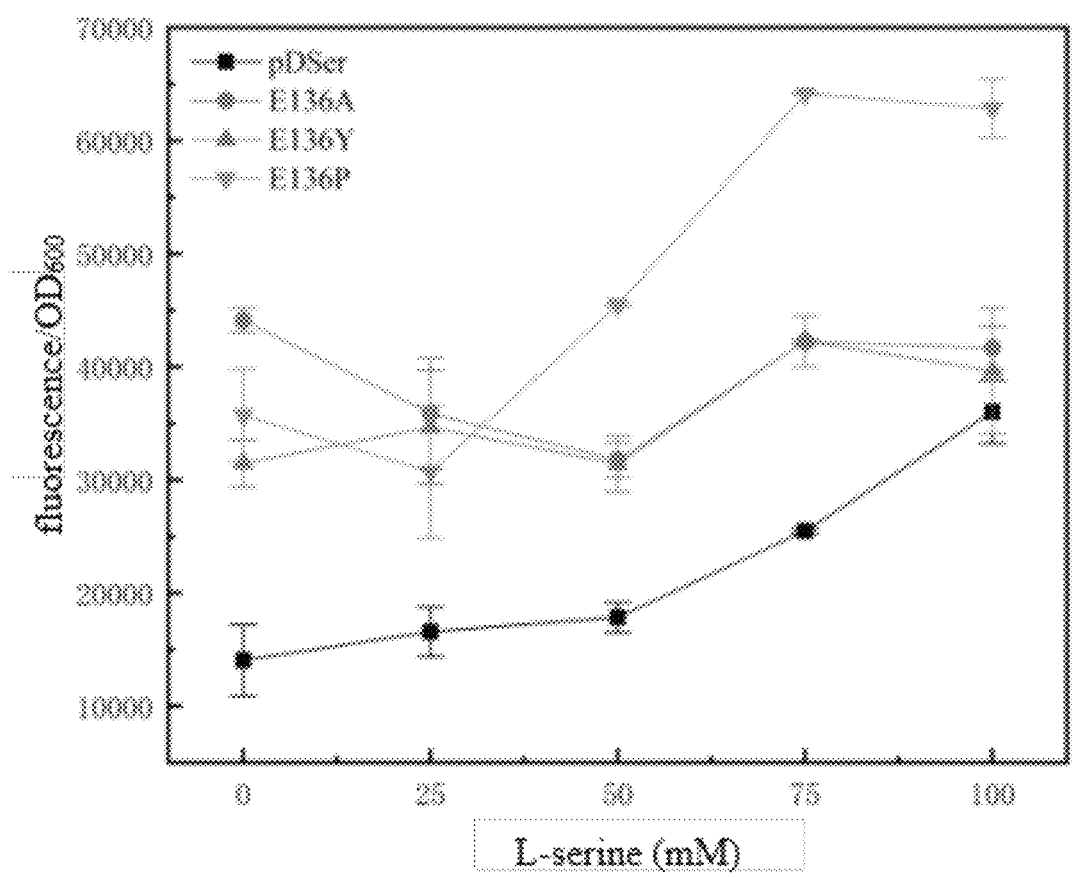
FIG. 2 shows the response of the wild-type NCgl0581 biosensor and the mutant thereof to L-serine.

Results show that when the concentration of L-serine reaches 50 mM, the biosensor based on wild-type NCgl0581 begins to respond, with detection limit of 50 mM; while the response curve of the biosensor based on mutant E136P begins to show an obvious upward trend when the concentration of L-serine is 25 mM, so the detection limit of L-serine is reduced to 25 mM. The experimental verification results show that the detection limit of the biosensor can be changed by E136P point mutation at the key site where the transcription factor NCgl0581 binds to L-serine; while the mutations of E136A and E136Y at this site have no effect on the response concentration of L-serine (FIG. 2).

Obviously, the examples above are only examples for clear explanation, not limitation of the embodiments. For those of ordinary skill in the art, other changes or variations in different forms can be made on the basis of the above description. It is not necessary and impossible to exhaust all the embodiments here. The obvious changes or variations derived therefrom are still within the scope of protection created by the present invention.

What is claimed is:

1. A transcription factor NCgl0581 mutant, wherein the mutant is obtained by mutating an 136th glutamic acid of an amino acid sequence as shown in SEQ ID NO.1 into proline.

2. A nucleic acid encoding the transcription factor NCgl0581 mutant according to claim 1.

3. An expression vector carrying the nucleic acid according to claim 2.

4. An L-serine detection product comprising a transcription factor NCgl0581 mutant, wherein the mutant is obtained by mutating the 136$^{th}$ glutamic acid of an amino acid sequence as shown in SEQ ID NO. 1 into proline, wherein the L-serine detection product further comprises a biosensor.

5. The L-serine detection product according to claim 4, wherein the biosensor comprises a coding gene of the transcription factor NCgl0581 mutant, a promoter for initiating expression of the coding gene of the transcription factor NCgl0581 mutant, a promoter $P_{SerE}$ and a reporter gene whose expression is activated by the promoter $P_{SerE}$.

6. A method for detecting L-serine, comprising the steps of incubating host cells containing the biosensor of claim 5 with a sample to be tested, and performing signal detection.

7. The method according to claim 6, further comprising the steps of:
S1, incubating a plurality of first samples containing L-serine with different concentrations with the host cells containing the biosensor, and detecting signal intensity of a reporter gene after the incubation is completed;
S2, establishing a relationship curve between signals of the reporter gene and concentrations of the L-serine in the first samples; and
S3, repeating the step S1 but replace the first samples with a second sample to be tested, and substituting a result into the relationship curve in S2 to calculate the concentration of the L-serine in the second sample,
wherein the concentrations of the L-serine in the first samples are known, and the concentration of the L-serine in the second sample is unknown.

* * * * *